United States Patent
Bodin et al.

(10) Patent No.: US 7,844,509 B2
(45) Date of Patent: *Nov. 30, 2010

(54) METHOD AND APPARATUS FOR MONITORING DEPLETION OF AN ITEM

(75) Inventors: William Kress Bodin, Austin, TX (US); Michael Lee Masterson, Cedar Park, TX (US); Stephen James Watt, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 156 days.

This patent is subject to a terminal disclaimer.

(21) Appl. No.: 11/467,195

(22) Filed: Aug. 25, 2006

(65) Prior Publication Data

US 2008/0052200 A1    Feb. 28, 2008

(51) Int. Cl.
*G06F 17/50* (2006.01)
*G08B 13/14* (2006.01)

(52) U.S. Cl. .................... 705/29; 340/572.1
(58) Field of Classification Search ............. 705/29; 340/571.2

See application file for complete search history.

(56) References Cited

U.S. PATENT DOCUMENTS

| | | | |
|---|---|---|---|
| 4,093,032 A | 6/1978 | Uyama et al. | |
| 4,563,739 A | 1/1986 | Gerpheide et al. | |
| 4,627,504 A | 12/1986 | Moran | |
| 4,964,053 A | 10/1990 | Humble | |
| 5,014,798 A | 5/1991 | Glynn | |
| 5,335,509 A * | 8/1994 | Namisniak et al. | 62/125 |
| 5,418,334 A | 5/1995 | Williams | |
| 5,487,276 A * | 1/1996 | Namisniak et al. | 62/125 |
| 5,711,160 A | 1/1998 | Namisniak et al. | |
| 5,726,880 A | 3/1998 | Bailey et al. | |
| 5,920,261 A | 7/1999 | Hughes et al. | |

(Continued)

FOREIGN PATENT DOCUMENTS

JP    08128881 A    5/1996

(Continued)

OTHER PUBLICATIONS

Scher, "RFID Shelf Antennas Featuring Dynasys de-Q Tuning", pp. 1-7, retrieved May 30, 2006 http://rfidusa.com/superstore/product_Info.php?cPath=21_39_60&products_id=223.

(Continued)

*Primary Examiner*—Matthew S Gart
*Assistant Examiner*—Ashford S Hayles
(74) *Attorney, Agent, or Firm*—Yee & Associates, P.C.; William H. Steinberg

(57) ABSTRACT

A computer implemented method, apparatus, system, and computer usable program code for monitoring a real-time depletion of an item in a storage unit. A controller identifies an item placed in the storage unit to form an identified item. The controller detects a change in mass sensor data from a mass sensor shelf in a set of mass sensor shelves associated with the storage unit. The controller associates the change in mass sensor data with the identified item to form a current mass for the identified item. The controller determines a depletion of the identified item based a difference between the current mass and a previous mass for the identified item.

17 Claims, 6 Drawing Sheets

U.S. PATENT DOCUMENTS

| | | | |
|---|---|---|---|
| 6,032,128 | A | 2/2000 | Morrison et al. |
| 6,089,498 | A | 7/2000 | Sticht |
| 6,101,826 | A | 8/2000 | Bessler |
| 6,158,381 | A | 12/2000 | Bray |
| 6,327,576 | B1 * | 12/2001 | Ogasawara ............... 705/22 |
| 6,393,848 | B2 * | 5/2002 | Roh et al. ............... 62/126 |
| 6,453,687 | B2 * | 9/2002 | Sharood et al. ........... 62/127 |
| 6,481,602 | B1 | 11/2002 | Fritze et al. |
| 6,519,963 | B2 * | 2/2003 | Maeda .................. 62/259.2 |
| 6,552,663 | B2 | 4/2003 | Swartzel et al. |
| 6,693,539 | B2 * | 2/2004 | Bowers et al. ........ 340/572.1 |
| 6,741,236 | B2 * | 5/2004 | Yun ........................ 345/173 |
| 6,758,397 | B2 | 7/2004 | Catan |
| 6,859,745 | B2 | 2/2005 | Carr et al. |
| 6,892,545 | B2 * | 5/2005 | Ishikawa et al. ......... 62/126 |
| 6,975,910 | B1 * | 12/2005 | Brown et al. ............. 700/90 |
| 7,009,519 | B2 | 3/2006 | Leonard et al. |
| 7,017,359 | B2 * | 3/2006 | Kim et al. ................ 62/127 |
| 7,027,958 | B2 * | 4/2006 | Singh et al. ............ 702/188 |
| 7,040,455 | B2 | 5/2006 | Bogat |
| 7,044,370 | B2 | 5/2006 | Bellis, Jr. et al. |
| 7,053,773 | B2 | 5/2006 | McGarry et al. |
| 7,065,501 | B1 * | 6/2006 | Brown et al. ............. 705/28 |
| 7,340,414 | B2 * | 3/2008 | Roh et al. ................ 705/23 |
| 7,382,267 | B2 | 6/2008 | Brendley et al. |
| 7,495,561 | B2 | 2/2009 | Bodin et al. |
| 7,673,464 | B2 | 3/2010 | Bodin et al. |
| 2002/0003531 | A1 | 1/2002 | Kim et al. |
| 2002/0026325 | A1 * | 2/2002 | Hirahara et al. ............ 705/1 |
| 2002/0066279 | A1 | 6/2002 | Kiyomatsu |
| 2002/0139848 | A1 | 10/2002 | Catan |
| 2002/0143624 | A1 | 10/2002 | Catan |
| 2002/0157411 | A1 * | 10/2002 | Ishikawa et al. .......... 62/231 |
| 2002/0178066 | A1 * | 11/2002 | Roh et al. ................. 705/22 |
| 2003/0014323 | A1 * | 1/2003 | Scheer ..................... 705/26 |
| 2003/0015585 | A1 | 1/2003 | Wike, Jr. et al. |
| 2003/0061129 | A1 * | 3/2003 | Todd et al. ............... 705/29 |
| 2004/0009465 | A1 * | 1/2004 | Luckanatinvong ............ 435/4 |
| 2004/0031274 | A1 * | 2/2004 | Cho et al. ................. 62/126 |
| 2004/0035123 | A1 * | 2/2004 | Kim et al. ................ 62/127 |
| 2004/0100380 | A1 * | 5/2004 | Lindsay et al. .......... 340/540 |
| 2004/0253733 | A1 * | 12/2004 | Prusik et al. ............... 436/2 |
| 2004/0254759 | A1 * | 12/2004 | Kubach et al. ........... 702/174 |
| 2005/0008539 | A1 * | 1/2005 | Matsuura et al. ......... 422/68.1 |
| 2005/0082376 | A1 | 4/2005 | Lubow et al. |
| 2005/0086108 | A1 * | 4/2005 | Sakamoto et al. .......... 705/14 |
| 2005/0132725 | A1 * | 6/2005 | Menten et al. ............ 62/126 |
| 2005/0155372 | A1 * | 7/2005 | Dentella et al. ........... 62/441 |
| 2005/0258961 | A1 * | 11/2005 | Kimball et al. ........ 340/572.1 |
| 2006/0006999 | A1 * | 1/2006 | Walczyk et al. ....... 340/539.27 |
| 2006/0055530 | A1 * | 3/2006 | Wang et al. ............ 340/539.13 |
| 2006/0171570 | A1 | 8/2006 | Brendley et al. |
| 2006/0199155 | A1 * | 9/2006 | Mosher ..................... 434/127 |
| 2006/0210115 | A1 * | 9/2006 | Nemet ....................... 382/104 |
| 2007/0035380 | A1 * | 2/2007 | Overhultz et al. ........... 340/5.9 |
| 2008/0052001 | A1 | 2/2008 | Bodin et al. |
| 2008/0052037 | A1 | 2/2008 | Bodin et al. |
| 2008/0052201 | A1 | 2/2008 | Bodin et al. |
| 2008/0052202 | A1 | 2/2008 | Bodin et al. |
| 2009/0099943 | A1 | 4/2009 | Bodin et al. |

FOREIGN PATENT DOCUMENTS

WO  2005015510 A1  2/2005

OTHER PUBLICATIONS

Lindsay et al., "Retial RFID Systems Without Smart Shelves", 2003, pp. 1-13, retrieved May 30, 2006 http://www.jefflindsay.com/rfid1.shtml.

Gilbert, "Major retailers to test smart shelves", ZDNet News: Jan. 8, 2003, pp. 1-6, retrieved May 31, 2006 http://news.zdnet.com/2100-9584_22-979710.html.

"itag", iTAG RFID—Smart Shelf, AC/Corporation, pp. 1-2, 2003-2006, retrieved May 12, 2006, http://www.ac-corporation.com.ph/products/iTAG/solutions/shelves.asp.

"Automated Livestock management with RFID-Driven Production Systems—15 Years of Work Applying RFID Technology to the Real World", Osborne Industries Inc., 2005, pp. 1-26.

USPTO Office action for related U.S. Appl. No. 11/467,214 dated Sep. 2, 2009.

USPTO Notice of Allowance for U.S. Appl. No. 11/467,187 dated Oct. 21, 2009.

USPTO office action for U.S. Appl. No. 11/467,224 dated Jun. 27, 2008.

USPTO Notice of Allowance for U.S. Appl. No. 11/467,224 dated Sep. 22, 2008.

USPTO office action for U.S. Appl. No. 11/467,190 dated Apr. 19, 2010.

USPTO office action for U.S. Appl. No. 11/467,200 dated Sep. 11, 2008.

USPTO office action for U.S. Appl. No. 11/467,200 dated Mar. 10, 2009.

USPTO Notice of Allowance for U.S. Appl. No. 11/467,200 dated Aug. 12, 2009.

USPTO office action for U.S. Appl. No. 11/467,214 dated Mar. 18, 2010.

USPTO Office ACtion for U.S. Appl. No. 11/467,214 dated Jul. 21, 2010.

* cited by examiner

METHOD AND APPARATUS FOR MONITORING DEPLETION OF AN ITEM

BACKGROUND

1. Field of the Invention

The present application relates generally to an improved data processing system, and in particular to a method and apparatus for a storage unit. Still more particularly, the present invention is directed to a computer implemented method, apparatus, system, and computer program product for monitoring depletion of an item in a storage unit.

2. Description of the Related Art

Typically, households and businesses store a variety of consumable items that are depleted through use. Once these items are partially or wholly depleted, a user must replace or replenish these items in order to maintain a constant supply. Depletion of consumable items in a household or business inventory can be monitored manually by visually inspecting the contents of various consumable items in stock and determining when items are in need of replacement. For example, a user can manually open a jar of peanut butter and visually determine the amount of peanut butter remaining in the jar. However, manual inspections can be time consuming, inaccurate due to human error, and burdensome due to the difficulties of checking every consumable item in a household or business inventory on a regular or semi-regular basis.

In addition to the time and manpower costs, if a depleted item is not checked and replaced in a timely manner, the item may not be available in a required amount when the item is needed by a user for a particular purpose. For example, it is extremely inconvenient to a user to discover an absence of new light bulbs in the house after a light bulb has burned out.

At present, some systems can perform automatic restocking of consumable items via trend analysis based on historical data. Automatic restocking systems can determine that an item, such as a gallon of milk, should be purchased every Friday based on previous usage trends for the item. However, this process is inadequate when external forces impact consumption of an item. For example, if a household relying on automatic restocking has two houseguests staying for a week, consumption of consumable items will be drastically different than the historical model. Therefore, many consumable items, such as milk, will be completely depleted before the next scheduled order interval. Moreover, in some cases, consumption of a particular item is too sporadic or infeasible to model based on previous usage of the item. In such cases, the restocking system is unable to accurately estimate depletion of those items.

Inventory systems utilizing identification tags, such as universal product codes (UPC) and Radio frequency identification (RFID) tags, placed on or inside product containers can be used to determine what items are present on a given shelf in a retail store. These systems are sometimes referred to as "smart shelves."

Smart shelves utilize radio frequency identification tag readers to identify products based on a unique identification code received from radio frequency identification tags associated with the products. However, radio frequency identification systems only provide information regarding the presence or location of an item on a retail store shelf. Current inventory systems do not provide information regarding the mass depletion or amount of the item remaining after the item has been partially or completely used. In other words, smart shelves enable users to track stock depletion as items are removed/sold from store shelves rather than mass depletion of an individual item as the item is used or depleted by consumers.

Some radio frequency identification systems can detect depletion of an item using a radio frequency identification tag having contacts inside the product container. When the contents of the container fall to a level below the contacts, the radio frequency identification tag sends a signal indicating that the product needs to be replaced. However, the system is only able to provide an indication of depletion at a single level, the point at which product is below the contacts. The system is unable to provide consistent, accurate, real-time depletion monitoring during the entire lifetime of the product.

Moreover, the system requires that physical contacts be placed inside each consumable item container. Such a requirement can be burdensome and cost prohibitive, particularly in a system involving a large inventory of consumable items that are constantly being consumed and replaced. If the contacts become disconnected or malfunction, a false depletion signal can be sent or an accurate depletion signal could fail to be sent. Such malfunctions would result in overstocking of some items and failure to restock other needed items.

SUMMARY

The illustrative embodiments provide a computer implemented method, apparatus, system, and computer usable program code for monitoring a real-time depletion of an item in a storage unit. A controller identifies an item placed in the storage unit to form an identified item. The controller detects a change in mass sensor data from a mass sensor shelf in a set of mass sensor shelves associated with the storage unit. The controller associates the change in mass sensor data with the identified item to form a current mass for the identified item. The controller determines a depletion of the identified item based on a difference between the current mass and a previous mass for the identified item.

BRIEF DESCRIPTION OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

DETAILED DESCRIPTION OF THE PREFERRED EMBODIMENT

Figure 1:
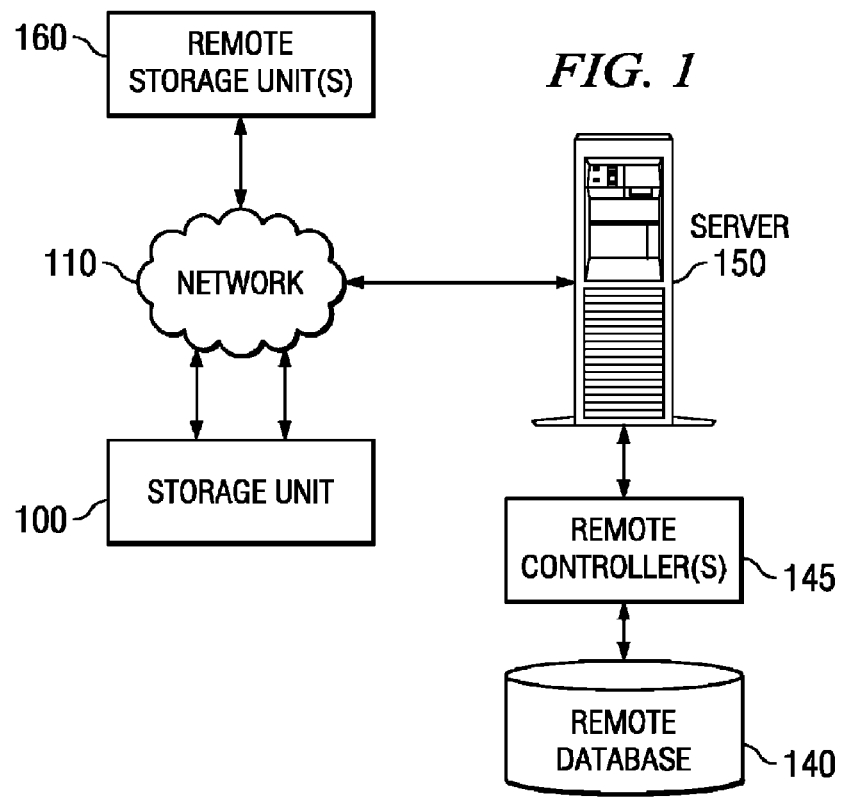
FIG. 1 is a pictorial representation of a network of storage units in which embodiments may be implemented in accordance with an illustrative embodiment.

Households, businesses, and industries frequently store a variety of consumable items that are depleted through regular or sporadic use. These items are generally stored in storage units located on site or at remote locations. As used herein, a storage unit is an appliance, room, or repository for storing and/or displaying items. A storage unit typically includes shelves or compartments to hold and/or organize items. A storage unit includes, but is not limited to, a refrigeration unit, a pantry, a storeroom, a cabinet, a set of shelves, a cupboard, a boxcar, a trailer, and/or any other compartment or container having space for storing and/or displaying items.

As used herein, a consumable item is any item that is depleted through use. Consumable items include, but are not limited to, food items, beverage items, soap, detergents, medicine, disposable paper products, and/or any other item that is depleted through use. Consumable items are generally consumed or depleted on a regular or semi-regular basis and then replaced and/or replenished by users in order to maintain a supply of these items in an inventory.

The items present in an inventory can be identified using a Universal Product Code. A Universal Product Code (UPC) is a machine readable bar code coupled with a human-readable Universal Product Code number. The Universal Product Code includes a six-digit manufacturer identification number and product item number that provides information regarding a product. A unique universal product code is not assigned to more than one product. Thus, a Universal Product Code scanner can read a Universal Product Code associated with a particular product to identify the product. The Universal Product Code may also include a non-depleted quantity for the item. The non-depleted quantity is the original amount of the product prior to use by a consumer. The Universal Product Code does not provide any information regarding a depletion level or amount of product remaining in a container after use by a consumer. Moreover, to maintain current inventories using Universal Product Codes, each item in an inventory must be manually scanned with a bar code reader. The Universal Product Code cannot provide information regarding the location of any product that is not currently being scanned.

Radio frequency identification (RFID) systems can be used to identify, locate, and track items in an inventory. Radio frequency identification is an automated identification method that is typically utilized in automating integrated supply chains within retail and distribution to identify and/or locate items currently in stock. Radio frequency identification systems utilize Radio frequency identification readers and Radio frequency identification tags to identify objects.

A Radio frequency identification reader is a device that includes a transmitter and a receiver. The reader transmits an interrogate signal to radio frequency identification tags within an interrogate zone of the reader. The reader receives radio frequency transmissions from the tags in response to the interrogate signal. The reader can estimate an approximate location of the tags based on the strength and direction of the response signal received from a given radio frequency identification tag.

A Radio frequency identification tag, also referred to as a transponder or smart tag, is a small integrated circuit coupled with an antenna to transmit data. A radio frequency identification tag can be attached to or incorporated into an item package or into the item itself. In response to receiving an interrogate signal, the radio frequency identification tag transmits data to the reader via an antenna associated with the tag. The transmitted data typically includes an identification code that can be used to obtain a description of the product associated with the given radio frequency identification tag.

Multiple radio frequency identification tags can reside within an interrogate zone of a single radio frequency identification reader. Each radio frequency identification tag in the interrogate zone can be individually recognized by the radio frequency identification reader based on the identification codes transmitted by each tag. Thus, a radio frequency identification reader can take an entire inventory of all items that have a radio frequency identification tag within the interrogate zone of that reader without requiring intervention of a human user. However, Radio frequency identification cannot be utilized to determine a real-time depletion of a given item in inventory.

Depletion of items can be estimated based on trend analysis of historical data. However, this system fails to compensate for the influence of external forces on the depletion of consumable items. For example, the presence of a temporary houseguest will impact the rate of depletion of a number of consumable household items, such as food items. Furthermore, a trend analysis system cannot estimate depletion for items that are consumed on a sporadic or unpredictable basis. Therefore, items in an inventory can be completely consumed before the next scheduled item replacement and/or replenishment because current systems are unable to automatically monitor real-time depletion of consumable items and compensate for usage variables.

The illustrative embodiments recognize the need for a system to track the real-time depletion of items in a storage unit. Therefore, the illustrative embodiments provide a computer implemented method, apparatus, system, and computer usable program code for monitoring a real-time depletion of an item in a storage unit. As used herein, a real-time depletion is the usage or depletion of an item as the usage/depletion occurs. The process monitors current or real-time usage of an item as consumption or depletion of the item occurs.

The process identifies an item placed in the storage unit to form an identified item. The process detects a change in mass sensor data received from a set of mass sensors on a mass sensor shelf. The process associates the change in mass sensor data with the identified item to form a current mass for the identified item. The process generates a mass footprint for the identified item based on mass footprint data. A mass footprint is information regarding an impression of a portion of the identified item in contact with the mass sensor shelf. Finally, the process determines a depletion of the identified item based a difference between the current mass and a previous mass for the identified item. The previous mass for a given identified item is retrieved from a database. The previous mass of the given item is identified based on a previous mass associated with the identified item and/or a previous mass associated with the mass footprint for the given item.

As used herein, a set of mass sensors includes a single mass sensor as well as two or more mass sensors. An item includes, but is not limited to, an individual consumable product in a single container, multiple consumable products in a single container, a carton or case of multiple containers, a pallet of multiple cartons or cases; and/or a load having multiple pallets. A load includes, but is not limited to, a truckload, shipload, or railcar load. As used herein, a container is any disposable or reusable package, receptacle, carton, can, jar, or any other object to hold, carry, or enclose one or more items for transport and/or storage.

FIG. 1 is a pictorial representation of a network of storage units in which the illustrative embodiments may be implemented in accordance with an illustrative embodiment. Storage unit 100 is a storage unit for storing a plurality of consumable items. In this illustrative example, storage unit 100 is a refrigeration unit.

Storage unit 100 is connected to network 110. Network 110 is a medium used to provide communications links between various devices and storage units connected together, such as storage unit 100 and remote storage unit(s) 160. Network 110 may include connections, such as wire, wireless communication links, or fiber optic cables.

Remote databases(s) 140 and remote controller(s) 145 connect to network 110 via one or more servers, such as server 150. Storage unit 100 may utilized a local controller and/or remote controller(s) 145 to determine a current/real-time depletion of one or more given items in a plurality of items stored in storage unit 100.

In the depicted example, server 150 provides data, such as boot files, operating system images, and applications to remote controller(s) 145 and remote storage unit(s) 160. Network 110 may include additional servers, clients, and other devices not shown.

Figure 2:
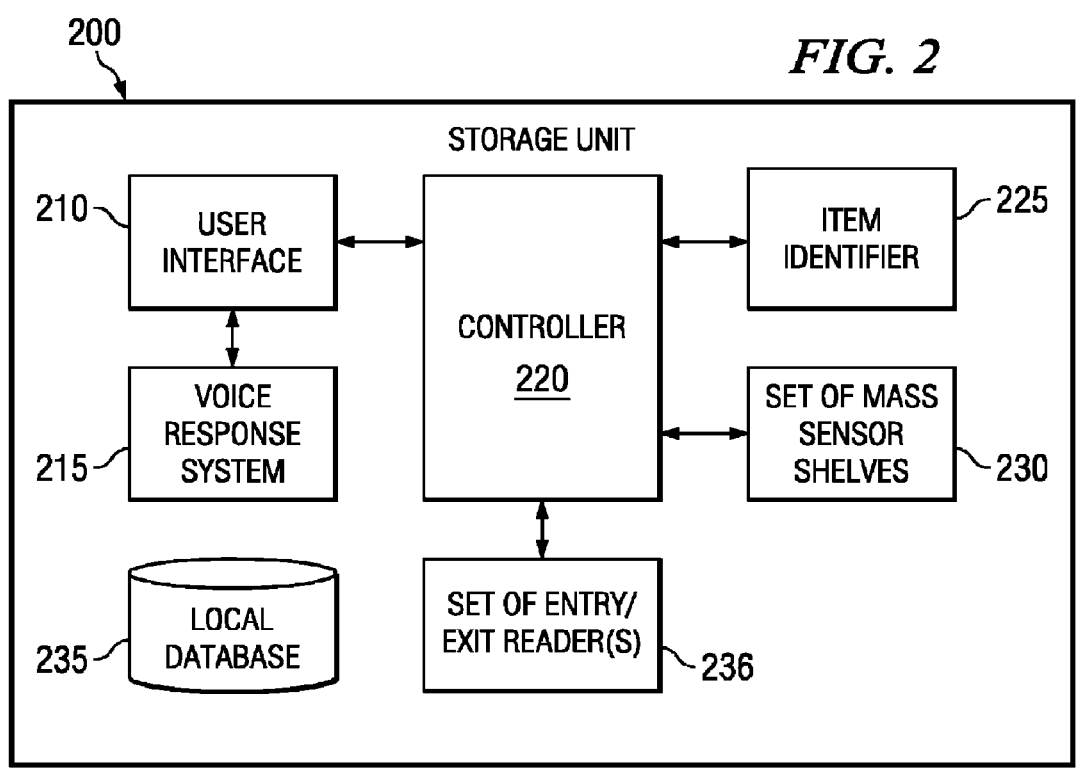
FIG. 2 is a pictorial representation of a storage unit in accordance with an illustrative embodiment.

FIG. 2 is a pictorial representation of a storage unit in accordance with an illustrative embodiment. Storage unit 200 is a storage unit for storing a plurality of consumable items, such as storage unit 100 and remote storage unit(s) 160 in FIG. 1.

User interface 210 provides a digital display for providing output to a user, as well as a keypad and/or touch screen for receiving input from a user. User interface 210 is associated with voice response system 215. Voice response system 215 includes a microphone, speaker, and voice synthesizer. Voice response system 215 also permits users to receive verbal output from control application 220, such as in providing text to speech operations.

Voice response system 215 permits users to provide verbal input to control application 220. For example, when control application 220 determines that a carton of milk in storage unit 200 is depleted and/or requires replacement, control application 220 provides a visual notification to a user via a display associated with user interface 210. Voice response system 215 also permits users to receive verbal output from control application 220, such as in text to speech operations. For example, when control application 220 determines that a current mass of an identified item exceeds a predetermined non-depleted mass for the item, voice response system 215 generates an auditory alert prompting a user to confirm the identification of the item. The auditory alert can take the form of a machine generated voice identifying the depleted item that needs to be replaced or replenished.

Control application 220 is an application for receiving input and sending output to a user via user interface 210. Control application 220 also identifies items associated with an identification tag placed in storage unit 200. Control application 220 also determines a real-time depletion of each identified item in storage unit 200 based on a mass data for each identified item.

Set of identification tags 225 is a set of one or more identification tags associated with one or more items in storage unit. As used herein, set of identification tags includes one or more identification tags. Each identification tag in set of identification tags 225 has a unique item identification code associated with the identification tag. In this illustrative example, set of identification tags 225 is a set of radio frequency identification tags associated with a set of consumable items inside storage unit 200.

Set of mass sensor shelves 230 is a set of one or more customized shelves having a mass sensor grid on an upper surface of the shelf. Each mass sensor associated with a mass sensor shelf is an independent sensor capable of measuring a mass of an object resting on the mass sensor. Each mass sensor transmits mass sensor measurements in the form of mass sensor data to control application 220.

Control application 220 stores mass footprint data, mass sensor data, item identification data, and meta information for each item stored in storage unit 200 in a local database 235 and/or remote database(s), such as remote database(s) 140 in FIG. 1. Local database 235 is any type of known or available data storage device. In this illustrative example, local database 235 is depicted as a database located on storage unit 200. However, local database 235 can also include any secondary data storage device and/or a remote data storage device, such as remote database 140 in FIG. 1. Local database 235 can be a single data storage device or multiple data storage devices.

Mass sensor data for an identified item includes a current mass for an item, a prior mass for the item, an initial mass for the item, a depleted mass for the item, and a non-depleted mass for the item. A current mass is the most recent mass measurement for the item. The prior mass for the item is the previous mass for an item. The initial mass is the first mass measurement for the item when the item is identified by control application 220 for the first time. The depleted mass is the tare or mass of the item's empty container. In other words, the depleted mass is the mass of the item after the contents or product has been completely consumed and the empty item container is all that remains.

Control application 220 monitors mass sensor data and meta information for each item based on the mass sensor data, meta information, and item identification information stored in local database 235 and/or remote databases. Meta information includes details like timestamps associated with an item expiration data, a data and/or time when an item is first detected entering a storage unit, a time when an item is removed from a storage unit, a time interval between a time when an item is removed from a storage unit and the time when the item is returned to the storage unit, and any other time and/or data information relevant to an item freshness, perishability, and expiration information. Meta information is associated with each identified item stored in storage unit 200. Thus, control application 220 can provide a warning or alert when an item is past its expiration date and/or no longer fit for human consumption due to the age of the item.

The net weight of the item is the depleted mass of the item subtracted from the gross weight of the item. The non-depleted mass is the net weight of the item. The non-depleted mass is a predetermined/predefined quantity of an item prior to use by a consumer. A non-depleted mass of a consumable item is the mass of the item at the time the item is purchased in an original unused condition. In an alternative embodiment, the non-depleted mass can be calculated by subtracting the item's tare weight from the item's initial or gross weight.

Item identification data includes an identification code from each identification tag in set of identification tags 225. Each identification code is associated with an item description. The item description describes the item. For example, an item description for cereal could be "Apple Jacks®," or "Frosted Flakes®."

Set of item identifier(s) 236 is a set of one or more item identifier(s). Item identifiers are used to identify an item as well as to determine an approximate location of an item. An approximate location of an item can be determined by a single item identifier. The item identifier receives a response signal from an identification tag. Control application 220 can determine an approximate location of the identification tag based on the strength and direction of the response signal. The item identifier generates approximate location coordinates for the approximate location of the identification tag. An item identifier in set of item identifier(s) 236 can be implemented by a radio frequency identification tag reader, a Universal Product Code scanner, or any other device for obtaining information from an identification tag. In an example in which the item identifier is a Universal Product Code scanner, a user scans each item at the Universal Product Code scanner. In an alternative example, a user can manually enter an identification code, item identifier, or other item description at a user interface rather than utilizing an item identifier.

Thus, in this illustrative example, control application activates set of item identifiers 236 when control application detects a door of storage unit 200 is opened. An item identifier transmits an interrogate signal. The item identifier identifies an item based on a response signal received from an identification tag associated with the item as the item enters storage unit 200 to form an identified item.

In an alternative embodiment, control application 220 activates item identifiers when a change in mass sensor data is received from one or more mass sensor shelves in set of mass sensor shelves 230.

A set of mass sensors associated with a given mass sensor shelf in set of mass sensor shelves 230 registers mass measurements for items in contact with one or more mass sensors on the given mass sensor shelf. Mass measurements for the identified item are registered when the identified item is placed on the given mass sensor shelf. The set of mass sensors transmits the mass data to control application 220.

Control application 220 determines whether a single identified item was placed on the given mass sensor shelf based on whether a single identification tag was detected entering the given mass sensor shelf. If only a single identified item was placed on the mass sensor shelf, control application 220 determines a location for a set of mass sensors providing new and/or changing mass sensor data. Control application 220 associates the location of the set of mass sensors as the location for the single identified item entering the mass sensor shelf.

Control application 220 determines the location of the item based on a mass footprint of the item generated when the item is placed on a given mass sensor shelf. The item's mass footprint is an impression of a portion of the item in contact with a mass sensor shelf. If two or more items are placed in the storage unit with a time interval occurring between placement of the items inside the storage unit, control application 220 associates a first change in mass data with the first item identified entering the storage unit. Control application 220 associates a second change in mass data with an item identified entering the storage unit second in time. Control application 220 utilizes the change in mass data to create a mass footprint and determine a current mass for the item identified immediately prior in time to the change in mass data.

If two or more items are identified entering the storage unit at the same time with no time interval in between the two items, control application 220 will associate a change in mass sensor data with the identified item having a corresponding mass footprint. For example, if a user places a jar of peanut butter and a carton of orange juice 200 at the same time, control application 200 will associated mass footprint data indicating a round mass footprint with the jar of peanut butter and associated mass footprint data indicating a square mass footprint with the carton of orange juice. Thus, control application 220 can distinguish items placed inside storage unit 200 simultaneously based on mass footprint data, such as the shape of the mass footprint.

If a user places two or more items in storage unit 200 at the same time that have similar mass footprint data, such as a jar of peanut butter and a jar of jelly, control application 220 will generate an error message and/or prompt a user to indicate a location and/or an identification of each item placed in the storage unit simultaneously.

In the alternative, control application 220 determines a location of the single identified item based on a strength and direction of the response signal generated/transmitted by the identification tag associated with the identified item. A single item identifier generates an estimated coordinates for the approximate location of the identified item based on the response signal. This approximate location is associated with the identified item.

Control application 220 generates a mass footprint for the identified item based on the mass data registered by the set of mass sensors associated with the location of the identified item. As used herein, a mass footprint includes, but is not limited to, data regarding a current mass of an identified item, an estimated location of an identified item, a precise location of an identified item, and/or a shape of a surface of an identified item in contact with a portion of a mass sensor shelf.

In this illustrative example, control application 220 can determine a current mass of an item placed on any mass sensor shelf within set of mass sensor shelves 230. Thus, if user places a carton of milk on a top shelf of storage unit 200, control application 220 will determine a current weight/mass for the carton of milk based on mass sensor data retrieved from the set of mass sensors on the top shelf in contact with the gallon of milk. When the user removes the milk, uses some milk, and returns the partially depleted carton of milk to a different shelf in storage unit 200, control application 220 is able to determine that mass sensor data received from a set of mass sensors located on the different shelf is mass data for the same carton of milk based on a mass footprint generated by control application 220, the prior mass for the carton of milk, the current mass of the newly entered item, the identification of the last identified item removed from the storage unit, and/or the identification of the last item entering the storage unit.

In other words, the identification tag identifies the last item removed from the storage unit as milk. The identification tag also identifies the entering item as milk. Control application 220 is able to guess that the newly entering item identified as milk on the different shelf is the same item identified as milk that was previously removed from the top shelf of the storage unit based on the identification code and mass footprint data for the item identified as milk. Control application 220 associates the new mass data received from the set of mass sensors on the different mass sensor shelf with the item identified as milk.

Control application 220 then retrieves the original non-depleted mass for the identified item. Control application 220 determines if the current mass of the identified item exceeds the non-depleted mass of the item. If the current mass does not exceed the non-depleted mass, the current mass is verified as the current mass of the identified item.

Once the current mass of an identified item is confirmed, control application 220 determines a real-time depletion level for the identified item by subtracting the current mass from the non-depleted mass for the identified item according to the following algorithm:

Depletion=(Non-depleted Mass)−(Current Mass).

The non-depleted mass is obtained from the identification tag, local database 235, remote database 240, and/or from a user input though user interface 210. The control application can determine a depletion for an identified item by subtracting the current mass from a previous/prior or initial mass for the identified item. The previous mass is always known because control application 220 stores a previous mass for each identified item in a database, such as local database 235 and/or remote database(s) 240. Control application 220 also stores an initial mass for an identified item in a database, such as local database 235 and/or remote database(s) 240.

If the current mass does exceed the non-depleted mass for the item, control application 220 must confirm that the current mass is the actual current mass by alternative methods. For example, in order to confirm the current mass for an identified item, control application 220 generates an alert via user interface 210. Control application 220 prompts a user to provide the identification of the item and/or confirm the location of the item via the user interface.

In the alternative, control application 220 verifies that only a single identification tag was detected entering a given mass sensor shelf. If control application 220 determines that more than one identified item was detected entering the same mass sensor shelf and/or mass sensor data is received from more than one set of mass sensors on the same mass sensor shelf, control application 220 will make an educated guess as to which set of mass sensor data is associated with each identified item based on an identification of the item, a non-depleted mass for each item, an initial mass for each item, a prior mass for each item, and/or current mass measurements received from each set of mass sensors. Control application 220 prompts user to confirm the identification and estimated location of each item via user interface 210.

Control application 220 can estimate which set of mass sensor data to associate with each identified item when two or more items are removed from storage unit 200 or entered into storage unit 200 by comparing previous mass footprints for items previously removed from storage unit 200 to current mass footprints for items in storage unit 200 to determine which mass footprint belongs to which identified item. Other factors, such as previous mass, current mass, non-depleted mass, mass footprint shape, previous items removed from storage unit 200, and items due to be replaced, can be looked up in a database to determine which mass footprint data belongs to which item.

Control application 220 monitors real-time depletion of each identified item in storage unit 200 by comparing current mass measurements for each item with a non-depleted mass for the item. When the current mass of an identified item reaches a threshold depletion, the item is identified as a depleted item. Control application 220 provides a notification to a user to replace and/or replenish depleted items via user interface 210.

The threshold depletion is a user defined depletion level. The threshold depletion indicates a threshold amount of an item remaining in an item container. The determination as to whether a depletion level has reached the threshold depletion for a given item is made based on a gross amount of an item remaining without subtracting a tare mass of an empty container. However, in this example, an accurate determination as to whether an item had reached the threshold depletion level may be inaccurate due to differences in container types. For example, a glass container has a greater mass than a plastic or cardboard container. Therefore, in another illustrative embodiment, a determination as to whether a depletion level has reached the threshold depletion for a given item is made based on a net amount of an item remaining after subtracting a tare mass of an empty container. In this manner, the affects of different container masses are taken into account when determining the current depletion of a given item.

In one example, control application 220 adds depleted items to a shopping list for a user to purchase the depleted items. In another example, control application automatically sends the shopping list to a service that delivers new goods to the location of storage unit 200. For example, control application 220 can transmit a list of depleted items to an online grocery provider having a goods delivery service via a network, such as network 110 in FIG. 1. The grocery provider delivers replacements for the depleted items to a user's home.

In another embodiment, a goods provider is able to gain access to storage unit 200 to deliver replacement items without intervention by a user. For example, storage unit 200 can include a back door or access panel to permit a delivery person to restock storage unit 200 without requiring a presence of a user to provide access to storage unit 200. In this embodiment, control application determines which depleted items in storage unit needs to be replaced and/or replenished, generates a list of the depleted items, transmits the list to a goods delivery service, and the goods delivery service delivers and restocks storage unit 200 without requiring any action by a user.

In another illustrative embodiment, a user may fail to scan an item at a location sensor and/or one or more location sensors may be absent, malfunctioning or otherwise unavailable or unable to detect/identify items entering storage unit and exiting storage unit 200. In such a case, control application 220 can determine when an item is placed inside storage unit 200 and/or removed from storage unit 200 based on mass footprint data for items.

Control application 220 uses the detection of item footprints for previously identified items to detect an item entry into storage unit 200 and/or the item exit/removal from storage unit 200. For example, if a user removes a jar of peanut butter and a carton of milk, control application 220 detects the removal of these two items based on the removal of the detected mass footprint on a mass sensor shelf associated with these items. In other words, when the two items are removed, the mass sensor data registered by the mass sensor shelf changes. Control application 220 can determine that the jar of peanut butter and the carton of milk were removed based on the absence of the footprint for the carton of milk and the footprint for the jar of peanut butter.

In this example, the user consumes some product from the carton of milk and jar of peanut butter then places the peanut butter and milk back into storage unit 200 within a configurable time interval. Control application 220 knows that two previously identified items were removed and two items with the same footprint have been added to storage unit 200. Control application 220 can check to ensure that the mass of the two items has not increased above the previous mass for the two remove items. Control application then correlates the items placed on the mass sensor shelf by matching the footprint of the two added items to the previously removed items.

If mass for one of the items has increased, the increase in mass could indicate replenishing or adding to the contents of the item container.

In addition, an increase in mass for an item could indicate a different item with the same footprint. In this case, re-identification or re-scanning of the item is necessary. In one example in which re-identification is required, control application 220 will prompt user to enter an item identification for the item with the increased mass via a user interface or a voice response system.

In this manner, control application 220 can identify/detect items that are not scanned and/or are not easily scanned on location sensors. An item could be difficult to scan if the item lacked radio frequency identification tags, the item identifier is a universal product code that must be manually scanned by a user, a user fails to scan an item, location sensors are malfunctioning, identification tags are malfunctioning, or location sensors and identification tags otherwise fail to provide an identification for the item. Thus, the illustrative embodiments permit triggering event handling of items based on a change in mass footprint data. A change in mass footprint data includes the appearance and disappearance of an item. Event handling of items includes depletion monitoring of items.

In this illustrative example, control application 220 is depicted as a separate component from item identifiers. However, in accordance with the illustrative embodiments, control application 220 can be combined with one or more item identifiers as a single component.

Figure 3:
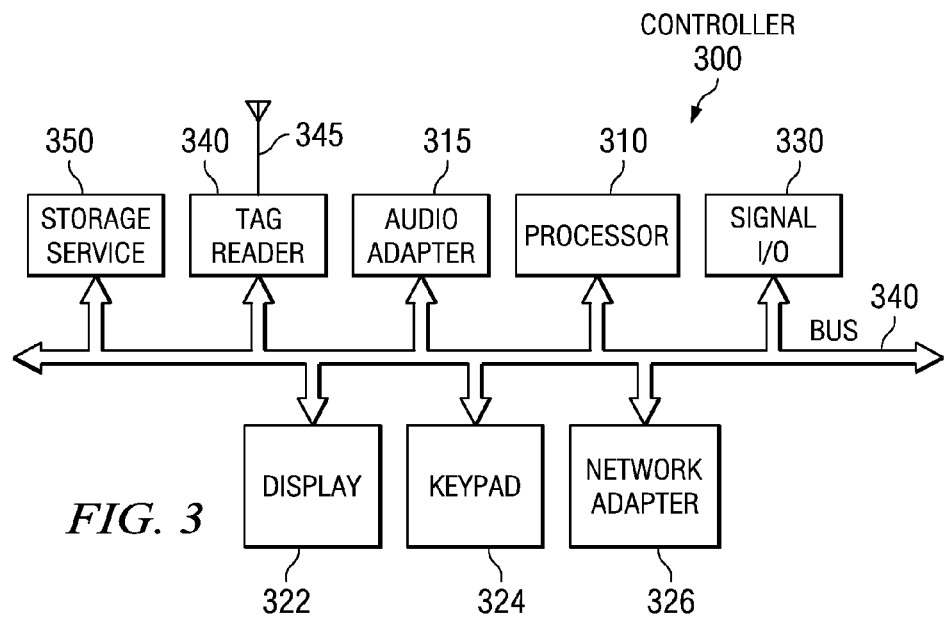
FIG. 3 is a block diagram of a control unit in accordance with an illustrative embodiment.

FIG. 3 is a block diagram of a control unit in accordance with an illustrative embodiment. A control unit is an application that analyzes the mass data from the set of mass sensors to determine the current mass of the object. Control unit 300 is an example of hardware for implementing a control application, such as the control application 220 in FIG. 2. Control unit 300 is a hardware in which code or instructions implementing the processes of the illustrative embodiments may be located. Control unit 300 executes computer usable program code for controlling item identifiers, mass sensor shelves, and a user interface in accordance with the illustrative embodiments.

Processor 310, audio adapter 315, memory 325, display 322, keypad 324, network adapter 326, and signal input/output (I/O) 330 are connected via bus 348. Bus 348 may be comprised of one or more buses, such as a system bus and/or an I/O bus. Bus 348 may be implemented using any type of communications fabric or architecture that provides for a transfer of data between different components or devices attached to the fabric or architecture.

Processor 310 may include one or more processors or CPUs. Memory 325 may be a main memory, a read only memory (ROM), a random access memory (RAM), flash memory, a cache, or any other known or available memory for storing data, instructions, and/or computer usable program code. Controller 300 retrieves data, instructions, and/or code from memory, such as main memory or read only memory. In addition, controller 300 can retrieve data, instructions, and/or code from a remote memory location via a network connection.

Display 322 can include a touch screen display, an LED display, or any other type of known or available display for presenting output to a user or receiving input from a user. Keypad 324 is any type of known or available alphanumeric keypad for a user to provide input in the form of data, instructions, or program code to controller 300.

Network adapter 326 is coupled to the system to enable the data processing system to become coupled to other data processing systems or remote printers or storage devices through intervening private or public networks. Modems, cable modem and Ethernet cards are just a few of the currently available types of network adapters.

Signal input/output 330 includes one or more devices for sending and receiving signals to and from different components in a storage unit, such as a digital display and keypad, a touch screen, a voice recognition interface, an LED display, and/or any other known or available devices for sending and receiving input and output.

Item identifier 340 is an item identifier such as set of item identifier(s) 236 in FIG. 2. Item identifier 340 transmits an interrogate signal to determine an identification and/or location of identification tags within an interrogate zone of item identifier 340.

Controller 300 is coupled to item identifier 340 via bus 348. Controller 300 activates item identifier 340 to transmit an interrogate signal to identify any radio Frequency Identification tags within an interrogate zone of item identifier 340. As used herein, an interrogate zone is a zone or region in which an interrogate signal has sufficient strength to be received by a radio Frequency Identification tag within the interrogate zone and trigger the Radio Frequency Identification tag to transmit a radio frequency in response to the interrogate signal.

Storage device 350 is also optionally connected to bus 348. Storage device 350 may include any type of permanent and removable storage media. In addition, storage device 350 can include a remote storage device or storage provided by a storage service. Program code and instructions are located on storage device 350 and may be loaded into memory 325 for execution by processor 310.

The processes of the illustrative embodiments are preformed by processor 310 using computer implemented instructions, which may be located in memory 325. Processor 310, memory 325, signal input/output 330, and storage device 350 are functional components that can be implemented as functions in an application specific integrated circuit rather than using a processor paradigm.

Figure 4:
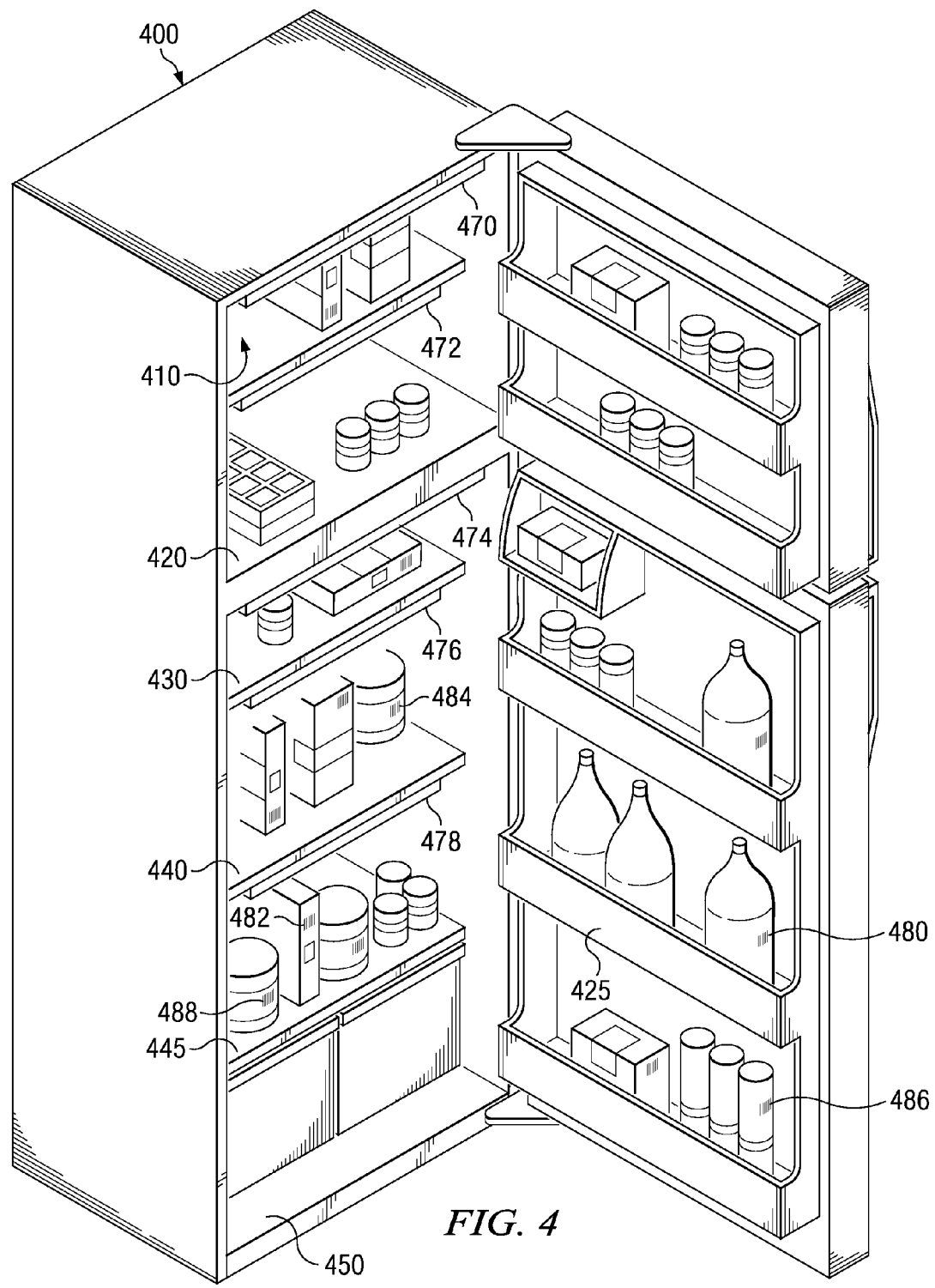
FIG. 4 is a block diagram of a refrigeration unit including a set of mass sensor shelves and item identifiers in accordance with an illustrative embodiment.

FIG. 4 is a block diagram of a refrigeration unit including a set of mass sensor shelves and item identifiers in accordance with an illustrative embodiment. As used herein, a refrigeration unit is any device, appliance, cabinet or room for storing food or any other substance at a lower temperature than room temperature. For example, a refrigeration unit includes a refrigerator, a freezer, a combination refrigerator and freezer, an ice box, a refrigerated railcar, a meat locker, an industrial refrigerator, an industrial freezer, a chest freezer, a reach-in cabinet, meat cases, frozen food cabinets, beverage coolers, food service carts, ice cream cabinets, soda fountain units, and any other known or available device or appliance for storing solid, semi-solid, or liquid items at a temperature lower than room temperature.

Refrigerator 400 is an example of a storage unit, such as storage unit 400 and remote storage unit(s) 120 in FIG. 1 and storage unit 200 in FIG. 2. Refrigerator 400 is any known or available type of refrigerator. In this illustrative example, refrigerator 400 is depicted as a consumer size refrigerator/freezer combination appliance. However, illustrative features described for the depicted embodiments are equally applicable to a refrigeration unit of any size, including, but not limited to, an apartment sized refrigerator/freezer, a room sized industrial refrigerator and/or a room-sized industrial freezer.

Refrigerator 400 includes a set of mass sensor shelves. As used here, a set of mass sensor shelves includes a single mass sensor shelf, as well as two or more mass sensor shelves. The set of mass sensor shelves includes mass sensor shelves 420-

450. Each mass sensor shelf has a grid of mass sensors. Each mass sensor in the grid is capable of detecting a whole or partial mass of an object. The mass of an object is detected when an object is completely or partially resting on any portion of a mass sensor.

In accordance with the illustrative embodiments, a mass sensor shelf can be a shelf in a main compartment of a refrigeration unit, a shelf in a door, a bottom surface of a compartment of a refrigerator or freezer, a bottom of a door compartment, a bottom surface of a drawer, a bottom surface of a specialized egg compartment, or any other surface within a storage unit that can hold or store an item. For example, in this illustrative embodiment, mass sensor shelf 420 is a mass sensor shelf located in a freezer compartment of refrigerator 400. Mass sensor shelf 425 is a shelf in a door of the refrigerator. Mass sensor shelves 430-445 are mass sensor shelves located in a refrigerator compartment of refrigerator 400. Mass sensor shelf 450 is a mass sensor shelf located in the bottom of a drawer of refrigerator 400.

Refrigerator 400 includes a set of item identifiers, such as item identifiers 470-478. Item identifiers 470-478 are Radio Frequency Identification readers. Item identifiers 470-478 identify an item entering or exiting refrigerator 400 based on information provided by an identification tag associated with the item.

In this illustrative example, item identifiers 470-478 are radio frequency identification readers. A single item identifier can determine an approximate coordinate location of an item based on a strength and direction of a response signal sent by an identification tag to an item identifier. In an alternative embodiment, item identifiers 470-478 are Universal Product Code scanners. In this example, a user scans an item for placement in refrigerator 400 at an item identifier.

In another example, a user manually enters an item identification in a user interface prior to placing the item in refrigerator 400, as the user places the item in refrigerator 400, or after the user places in item in refrigerator 400. In this example, if a user does not enter an identification for an unidentified item, a user interface associated with refrigerator 400 will prompt the user to enter an item identification via the user interface.

Refrigerator 400 also includes a control application for controlling item identifiers 470-478 and receiving mass data from the set of mass sensor shelves associated with refrigerator 400. The control application is coupled to a user interface. The user interface receives data from a user and provides data to a user. In this example, the user interface is located on an outside panel of a door or outer side wall of refrigerator 400, although the user interface is not depicted in the figure.

The user interface is a digital display and keypad that provides output to a user and accepts input from the user. The digital display is any type of display for providing information to a user in the form of characters, numbers, symbols, or letters. The display also includes a touch screen for accepting input from a user. The keypad is an input device for data entry by a user. The keypad comprises alphanumeric keys and functional keys. In another example, the user interface includes voice recognition software coupled to a microphone and a voice synthesizer for accepting verbal input from a user and providing verbal output to a user.

Refrigerator 400 includes a variety of items stored within refrigerator 400. A number of the items have an identification tag associated with the item, such as identification tags 480-488. In accordance with this example, identification tags 480-488 are Radio Frequency Identification tags.

Item identifiers 470-478 are each located in a position parallel to a mass sensor shelf below the given item identifier. For example, item identifier 470 is located above a mass sensor shelf such that item identifier 470 is parallel or horizontal to the mass sensor shelf below it. However, item identifiers 470-478 can be placed at any location within refrigerator 400 in order to receive and transmit radio frequencies to Radio Frequency Identification tags associated with items inside refrigerator 400. For example, item identifier 478 could be positioned on a side wall of the upper shelf inside the refrigerator compartment, on a back wall of the refrigerator compartment, or on a face of the refrigerator door.

In this illustrative embodiment, five item identifiers are depicted. However, in accordance with the illustrative embodiments, any number of item identifiers may be located within a storage unit, such as refrigerator 400. For example, an item identifier can be positioned in a location parallel to every shelf in refrigerator 400. In this example, six item identifiers are located within refrigerator 400.

In another example, two or more item identifiers can be consolidated into a single item identifier unit. For example, item identifier 470 and item identifier 472 can be consolidated into a single item identifier positioned in a location parallel to the upper shelf in the freezer compartment. This consolidated item identifier could receive and transmit radio frequencies from Radio Frequency Identification tags on the upper shelf and the lower shelf in the freezer compartment, as well as the upper shelf and lower shelf in the door of the freezer compartment. Thus, in this illustrative example, a single item identifier is capable of receiving and transmitting radio frequencies to Radio Frequency Identification tags located anywhere within the freezer compartment of refrigerator 400.

In accordance with another illustrative embodiment, an item identifier can be incorporated within the mass sensor shelf itself. In such an embodiment, the mass sensor shelf is capable of transmitting an interrogate signal to Radio Frequency Identification tags within an interrogate zone of the mass sensor shelf. The mass sensor shelf is also capable of receiving radio frequencies transmitted by Radio Frequency Identification tags within a reception range of the mass sensor shelf.

In another example, a set of item identifiers are located in a plane of a door to refrigerator 400. The set of item identifiers are activated to scan for an item entering refrigerator 400 or being removed from refrigerator 400 when a door to refrigerator 400 is opened. As used herein, a set of item identifiers includes a single item identifier, as well as two or more item identifiers. Therefore, in this example, only a single item identifier or a single pair of item identifiers are required to scan for items entering refrigerator 400.

In this example, a user is not required to manually scan identification tags at item identifiers 470-478. Item identifiers are capable of automatically sending and receiving radio frequencies to activate Radio Frequency Identification tags to transmit identification codes without user intervention.

Item identifiers 470-478 are automatically activated to scan for identification tags being placed inside and/or removed from a storage unit such as refrigerator 400, when a door to the storage unit is opened. In another example, item identifiers 470-478 are activated to scan for identification tags when a change in mass sensor data from a set of mass sensors occurs. In yet another alternative example, item identifiers 470-478 are activated on a periodic or cyclical basis to identify items associated with identification tags 480-488.

In accordance with an alternative embodiment, identification tags, such as identification tags 480-488, are Universal Product Code bar codes and item identifiers, such as item identifiers 470-478, are Universal Product Code scanners. In this embodiment, a user manually scans identification tags, such as tag 480 at an item identifier, such as item identifier 478. Identification tag 480 is scanned by the user when the item is placed in the storage unit and/or removed from the storage unit.

In this embodiment, only a single Universal Product code scanner item identifier is required for a user to scan items before placement in a storage unit and/or removal of items from the storage unit. In this example, the single Universal Product Code scanner item identifier can be located on an outside face of a door of a storage unit, such as the door to the freezer compartment of refrigerator 400. A user scans each item to be placed inside refrigerator 400 at the item identifier located in the door of freezer compartment 410 prior to placing the item inside refrigerator 400. In this manner, the process can identify each item as the item is scanned for placement inside refrigerator 400. However, any number of item identifiers may be utilized in a storage unit in accordance with this embodiment.

In another example, an item is identified based only on a mass footprint for the item. For example, a jar of peanut butter can be identified based on the fact that a jar of peanut butter was removed from storage unit 200, a time interval passed, and a newly detected item having the same mass sensor footprint as the peanut butter is placed on a given mass sensor shelf. If a user places a jar of peanut butter and a carton of orange juice in refrigerator 400 at the same time, the control application will associated mass footprint data indicating a round mass footprint corresponding to a jar of peanut butter as a current mass and footprint for the peanut butter. The control application will associate mass data indicating a square mass footprint corresponding to a carton of orange juice as a current mass and footprint for the carton of orange juice. Thus, the control application can distinguish items placed refrigerator 400 simultaneously based only on mass footprint data, such as the shape of the mass footprint.

If a user places two or more items in refrigerator 400 at the same time that have similar mass footprint data, such as a jar of peanut butter and a jar of jelly, the control application will require re-identification of the items. The control application will generate an error message and/or prompt a user to indicate a location and/or an identification to re-identify each of the items that were placed in the storage unit simultaneously. This illustrative embodiment in which an item is identified based on a mass footprint rather than scanning by an item identifier could be utilized in a system including, but not limited to, item identifiers that are Universal Product Code scanners that require manual scanning of each item and/or a user interface that requires a user to manually enter an item description/item identification for each item.

Figure 5:
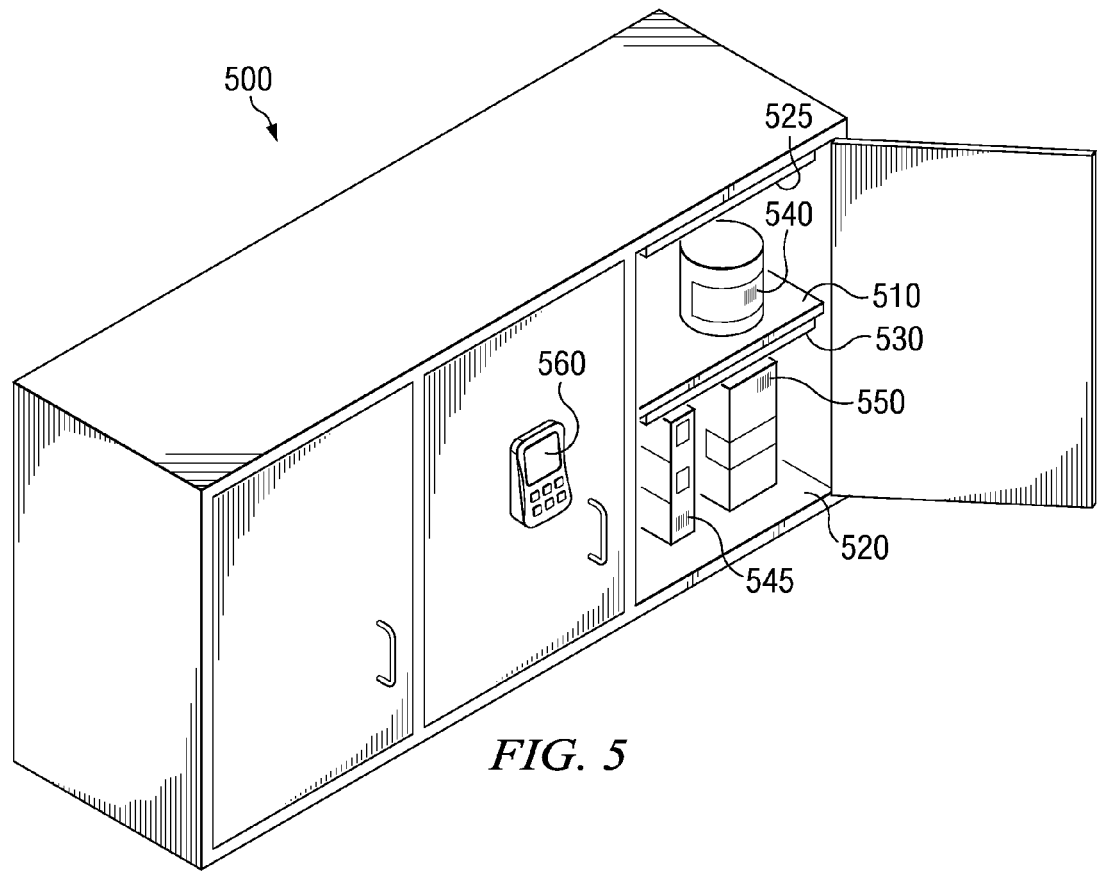
FIG. 5 is a block diagram of a cabinet including a set of mass sensor shelves and item identifiers in accordance with an illustrative embodiment.

FIG. 5 is a block diagram of a cabinet including a set of mass sensor shelves and item identifiers in accordance with an illustrative embodiment. Cabinet 500 is a storage unit, such as storage unit 100 and remote storage unit(s) 120 in FIG. 1 and storage unit 200 in FIG. 2.

Cabinet 500 includes a set of mass sensor shelves and a set of item identifiers. The set of mass sensor shelves includes mass sensor shelf 510 and mass sensor shelf 520.

In this illustrative example, item identifiers 525-530 are Radio Frequency Identification readers. Item identifiers are positioned above each mass sensor shelf. For example, item identifier 525 is located above and parallel to mass sensor shelf 510. Item identifier 530 is positioned above and parallel to mass sensor shelf 520.

Cabinet 500 includes a number of consumable items stored inside cabinet 500. In this example, each consumable item inside cabinet 500 has an identification tag, such as identification tags 540-550, associated with the item. Items associated with an identification tag can include any consumable item. For example, the items associated with identification tags 540-550 could include, but are not limited to, cereal, detergent, oatmeal, flour, plastic forks, coffee filters, salt, pet food, or any other item that is depleted through use.

In this example, item identifiers 525-530 are automatically activated to scan for items being placed inside cabinet 500 and items being removed from cabinet 500 when the cabinet door is opened.

In another example, item identifiers 525-530 are activated to scan for items placed inside cabinet 500 when a change in mass sensor data from a set of mass sensors occurs. In yet another alternative example, item identifiers 525-530 are activated on a periodic or cyclical basis to identify and locate items in cabinet 500 associated with identification tags 540-550.

Cabinet 500 also includes a control application for controlling item identifiers 525-530 and receiving mass data from the set of mass sensor shelves associated with refrigerator 100. The control application receives data from a user and provides data to a user via user interface 560 located in a face of a door of cabinet 500.

User interface 560 is a digital display and keypad that provides output to a user and accepts input from the user. The digital display is any type of display for providing information to a user in the form of characters, numbers, symbols, or letters. The display can also include a touch screen for accepting input from a user. The keypad is an input device for data entry by a user. The keypad comprises alphanumeric keys and functional keys.

In accordance with an alternative example, item identifiers 525-530 are Universal Product Code scanners and identification tags 540-550 are Universal Product Code bar codes. In this example, a user must manually scan identification tags 540-550 at one of item identifiers 525-530 when an item associated with identification tags 540-550 are placed inside cabinet 500 and/or removed from cabinet 500.

Figure 6:
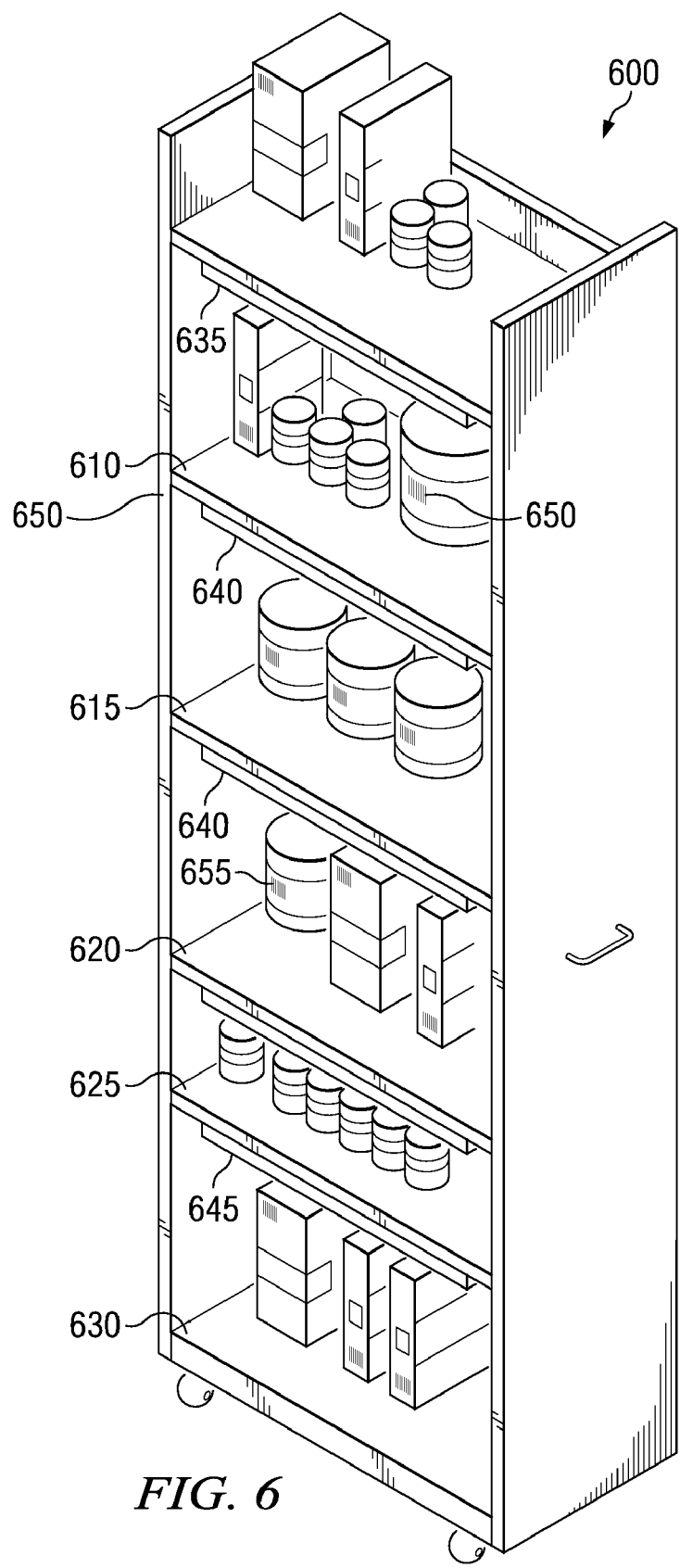
FIG. 6 is a block diagram of a set of shelves including mass sensor shelves and item identifiers in accordance with an illustrative embodiment.

FIG. 6 is a block diagram of a set of shelves including mass sensor shelves and item identifiers in accordance with an illustrative embodiment. Set of shelves 600 is an exemplary embodiment of a storage unit.

Set of shelves 600 includes a set of one or more mass sensor shelves. The set of mass sensor shelves includes mass sensor shelf 610, mass sensor shelf 615, mass sensor shelf 620, mass sensor shelf 625, and mass sensor shelf 630. In this example, set of shelves 600 includes five mass sensor shelves. However, in accordance with the illustrative embodiments, set of shelves 600 can include any number of mass sensor shelves.

Set of shelves 600 also includes a set of item identifiers. The set of item identifiers includes item identifier 635, item identifier 640, and item identifier 645. Set of shelves contains consumable items. Some of the consumable items have identification tags associated with the items, such as identification tags 650-655. In this example, identification tags 650-655 are Radio Frequency Identification tags.

In this illustrative example, item identifiers 625-630 are Radio Frequency Identification readers. Item identifiers 635-645 are activated by the controller to transmit an interrogate signal. The interrogate signal is received by a set of identification tags when a change is mass sensor data from a set of mass sensors associated with a mass sensor shelf is detected. As used herein, a set of identification tags includes a single identification tag, as well as two or more identification tags.

In another example, item identifiers 635-645 are activated by a motion detection apparatus incorporated within item identifiers 635-645. The motion detection apparatus detects motion when a user places an item in set of shelves and/or removes an item from set of shelves. Upon detecting motion, the motion detection apparatus activates an item identifier associated with the motion detection apparatus.

In this example, each item identifier is located along a side wall of set of shelves 600. However, in accordance with another embodiment, an item identifier can be located anywhere in association with set of shelves 600. For example, item identifier 635 can be positioned in a location above and parallel to a mass sensor shelf below the item identifier, such as mass sensor shelf 610.

Set of shelves 600 also includes a user interface. The user interface is a digital display and keypad that provides output to a user and accepts input from the user. The user interface also includes voice recognition software, a microphone, a speaker, and a voice synthesizer for accepting verbal/audio input from a user and providing verbal/audio output to a user.

Although the illustrative example does not depict a mass sensor shelf and item identifier associated with the upper most shelf of set of shelves, in another example, the upper most shelf is also a mass sensor shelf having an item identifier associated with the uppermost shelf.

In this illustrative example, set of shelves 600 is a set of shelves in a location at room temperature. In another illustrative example, set of shelves 600 is a set of shelves inside an industrial sized walk-in refrigeration unit. In such a case, the consumable items stored on set of shelves 600 can be items stored at a temperature lower than room temperature. In another example, set of shelves 600 is located in a heated room. In this example, items stored on set of shelves 600 are items stored at a temperature higher than room temperature.

In accordance with an alternative example, item identifiers 635-645 are Universal Product Code scanners and identification tags 650-655 are Universal Product Code bar codes. In this example, a user must manually scan identification tags 650-655 at one of item identifiers 635-645 when an item associated with identification tags 650-655 are placed inside set of shelves 600 and/or removed from set of shelves 600.

Those of ordinary skill in the art will appreciate that the storage units depicted in FIGS. 1-6 may vary. The depicted examples are not meant to imply architectural limitations with respect to an illustrative embodiment. For example, a storage unit in accordance with the illustrative embodiments could also include a pantry, a cupboard, a closet, a portable storage unit, or an oven. As used herein, an oven is a chamber or enclosed compartment for sterilizing, heating, warming, or cooking. An oven includes, but is not limited to, a stove, a kiln, a green house, a heated rail car, and/or a microwave oven.

Figure 7A:
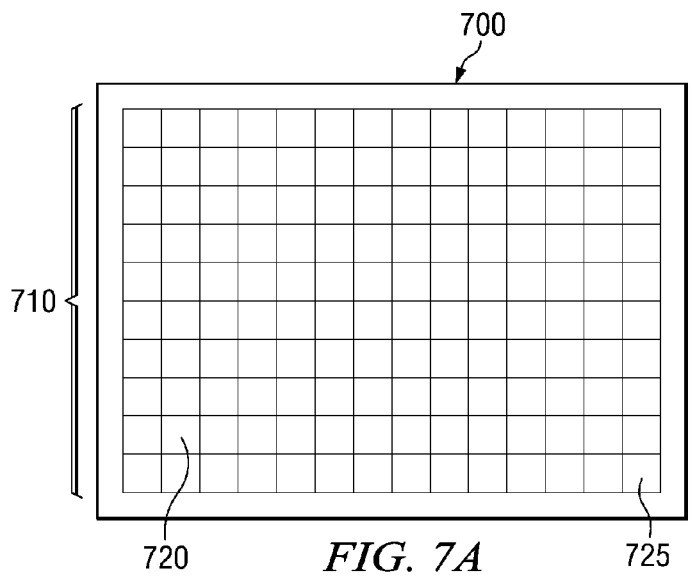
FIG. 7A is a block diagram of a mass sensor shelf having a mass sensor grid in accordance with an illustrative embodiment.

FIG. 7A is a block diagram of a mass sensor shelf having a mass sensor grid in accordance with an illustrative embodiment. Mass sensor shelf 700 is a mass sensor shelf inside a storage unit, such as refrigerator 400 in FIG. 4, cabinet 500 in FIG. 5, and set of shelves 600 in FIG. 6. Mass sensor shelf 700 has a mass sensor grid 710 spanning the entire area of an upper surface of mass sensor shelf 700. Mass sensor grid includes a plurality of mass sensors, such as mass sensor 720 and mass sensor 725.

Each block in mass sensor grid 710 represents an individual mass sensor in the plurality of mass sensors. Each sensor is separate and isolated from every other sensor in the mass sensor grid. In this illustrative example, mass sensors 720-725, are tiny mass sensors measuring one centimeter by one centimeter. In accordance with the illustrative embodiments, mass sensors can be any shape and any size mass sensors. For example, mass sensors 720-725 can measure one centimeter by two centimeters, or any other size.

Mass sensors in mass sensor grid 710 can measure a mass of an item wholly or partially placed on top of a given mass sensor. Thus, when an object is placed on a mass sensor shelf, each mass sensor covered by the object will generate mass data regarding a portion of the object. The process utilizes mass data from the set of mass sensors covered by an object on a mass sensor shelf to determine a mass of the object.

Figure 7B:
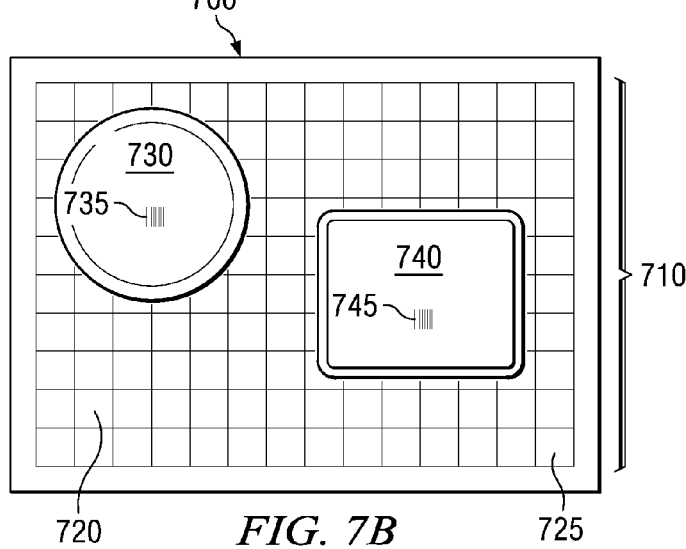
FIG. 7B is a block diagram of a mass sensor shelf having a mass sensor grid and consumable items on the shelf in accordance with an illustrative embodiment.

FIG. 7B is a block diagram of a mass sensor shelf having a mass sensor grid and consumable items on the shelf in accordance with an illustrative embodiment. Jar of peanut butter Unit 730 is located on mass sensor shelf 700. Unit 730 rests on a set of mass sensors of mass sensor grid 710. The set of mass sensors generates mass data regarding the mass of unit 730.

Unit 730 is associated with identifier tag 735. Identifier tag 735 is read by an item identifier to identify unit 730 as a jar of peanut butter.

In this example, a Tupperware of tuna salad is also located on mass sensor shelf 700. The Tupperware of tuna salad unit 740 is associated with identifier tag 745. An item identifier utilized identification data available from identifier tag 745 to identify unit 740 as a Tupperware of tuna salad. A set of mass sensors covered by unit 740 generate mass data regarding the mass of unit 740. This information is transmitted to a controller. The controller is an application that can determine a depletion of a particular item based on the data from an identification tag and mass data from the set of mass sensors.

Thus, when an object is placed on a mass sensor shelf, the object will rest on a set of mass sensors on the portion of the shelf covered by the object. Each mass sensor in the set of mass sensors transmits mass data regarding the mass of the object to a controller.

The controller creates a mass footprint for the identified item. The mass footprint is an impression of a shape of a portion of the identified item in contact with a portion of the mass sensor shelf. The portion of the mass sensor shelf in contact with the identified item is the set of mass sensors transmitting mass data regarding the mass of the identified item. In this example, Unit 730 has a mass footprint indicating a current mass of unit 730 and a shape of a surface of unit 730 in contact with mass sensor shelf 700. The shape indicated by the mass footprint is round. In this example, either the top or bottom of a jar of peanut butter is in contact with a portion of mass sensor shelf 700.

Likewise, the mass footprint for unit 740 indicates a current mass of unit 740 as well as a shape of a surface of unit 740 in contact with a portion of mass sensor shelf 700. In this example, unit 740 has a square shaped mass footprint, as a surface of the Tupperware of tuna salad in contact with mass sensor shelf 700 is square. In this case, the surface of the Tupperware of tuna salad in contact with a portion of mass sensor shelf could include a top, a bottom, or a side of a square Tupperware container.

If unit 730 and unit 740 are pressed against each other, the mass sensors in contact with unit 730 and 740 may appear to be covered by a single item. In such a case, the mass sensor data from the set of mass sensors covered by unit 730 and the set of mass sensor in contact with unit 740 may be combined by the controller to form a single mass sensor footprint. However, the controller can determine that the single mass footprint actually belongs to two items rather than one item if two response signals are received from two identification tags. For example, if one response signal is received from identification tag 735 associated with unit 730 and another response signal is received from identification tag 745 associated with unit 740, the controller will determine that the single mass sensor data is attributable to units 730 and 740.

In such a case, the controller will isolate a set of mass sensors for unit 730 based on a previous mass footprint for unit 730 and a previous mass footprint for unit 740. A previous mass footprint comprises a previous mass for a given unit as well as the shape of a surface in contact with a portion of a mass sensor shelf in a set of mass sensor shelves for the given storage unit.

In the illustrative embodiment shown in FIGS. 7A and 7B, the mass sensor shelf includes a grid array containing a mass sensor for each portion of the grid. The grid array determines a current mass for an item in contact with the grid array, as well as a mass footprint or impression of the portion of the item in contact with the grid array.

However, in another exemplary embodiment, the grid array includes a single mass sensor, rather than a plurality of mass sensors in a grid. In this example, the grid array is used only in the calculation of the mass footprint or impression of the item in contact with the shelf to create a footprint for the item. The mass of the item is determined by subtracting a previous mass for the entire shelf, including all items on the shelf, from a current mass for the entire shelf, also including all items on the shelf.

Thus, mass change is identified by placing an item on the given shelf and measuring the resultant change in total mass of the shelf. The control application correlates the change in mass with the resultant change in mass footprint data. The change in mass footprint data is due to the additional mass of the item added to the given mass sensor shelf. The change in mass is associated with a newly detected mass footprint for the item. The newly detected mass footprint and the change in mass for the entire shelf are associated with the item placed on the given mass sensor shelf when the change in mass and mass footprint data are detected.

Figure 8:
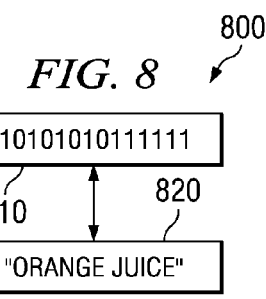
FIG. 8 is a block diagram illustrating an association of an identification code from an identifier tag with a consumable item description in accordance with an illustrative embodiment.

FIG. 8 is a block diagram illustrating an association of an identification code from an identifier tag with a consumable item description in accordance with an illustrative embodiment. Data structure 800 is an example of data stored in a database, such as local database 235 in FIG. 2 and remote database 140 in FIG. 1.

The description pair includes a machine readable identification code, such as "10101010111111" associated with identification tag 810. The pair also includes a human readable item description 820 that is associated with identification code "10101010111111" associated with identification tag 810. Other examples of identification codes include, for example, "1234564", "A", or any other code that is unique among all identification codes that a tag reader can read.

In this illustrative example, identification tag 810 having code "10101010111111" is associated with item description "orange juice" 820. An item description is a human understandable description of an item. Human understandable descriptions are for example, text, audio, graphic, or other representations suited for display or audible output.

A user interface and tag reader operates cooperatively with identification tags to identify items for placement in a storage unit and/or identify already placed inside a storage unit. Identification tags, such as identification tag 810 can be any type of identification tag, including Universal Product Code (UPC) bar code identification tags and Radio Frequency Identification (RFID) tags. Radio Frequency Identification tags include read-only identification tags and read-write identification tags.

A read-only identification tag is a tag that generates a signal in response to receiving an interrogate signal from an item identifier. A read-only identification tag does not have a memory.

A read-write identification tag is a tag that responds to write signals by writing data to a memory within the identification tag. A read-write tag can respond to interrogate signals by sending a stream of data encoded on a radio frequency carrier. The stream of data can be large enough to carry multiple identification codes.

Figure 9:
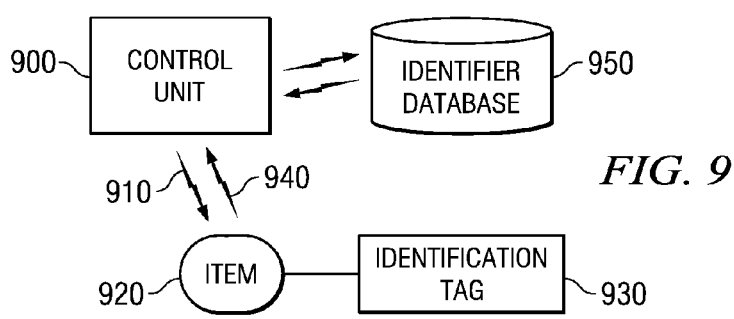
FIG. 9 is a block diagram illustrating an interaction of a user interface and tag reader with an identification tag in accordance with an illustrative embodiment.

FIG. 9 is a block diagram illustrating an interaction of a user interface and tag reader with an identification tag in accordance with an illustrative embodiment. Control unit 900 is a control unit such as control unit 200 in FIG. 2. Control unit 900 includes a user interface and item identifier(s). Control unit 900 activates an item identifier associated with a storage unit to generate interrogate signal 910 to form an interrogation zone. Item 920 is located within the interrogation zone of the item identifier. Identification tag 930 associated with item 920 receives interrogate signal 910. In response to receiving interrogate signal 910, identification tag 930 generates response signal 940 via an antenna on the identification tag.

Control unit 900 receives response signal 940. Control unit 900 analyzes response signal 940 to identify an identification code for item 920. Control unit 900 identifies item 920 by identifying an item description, such as item description 820 in FIG. 8, in identifier database 950 associated with the identifier code for identification tag 930.

Figure 10:
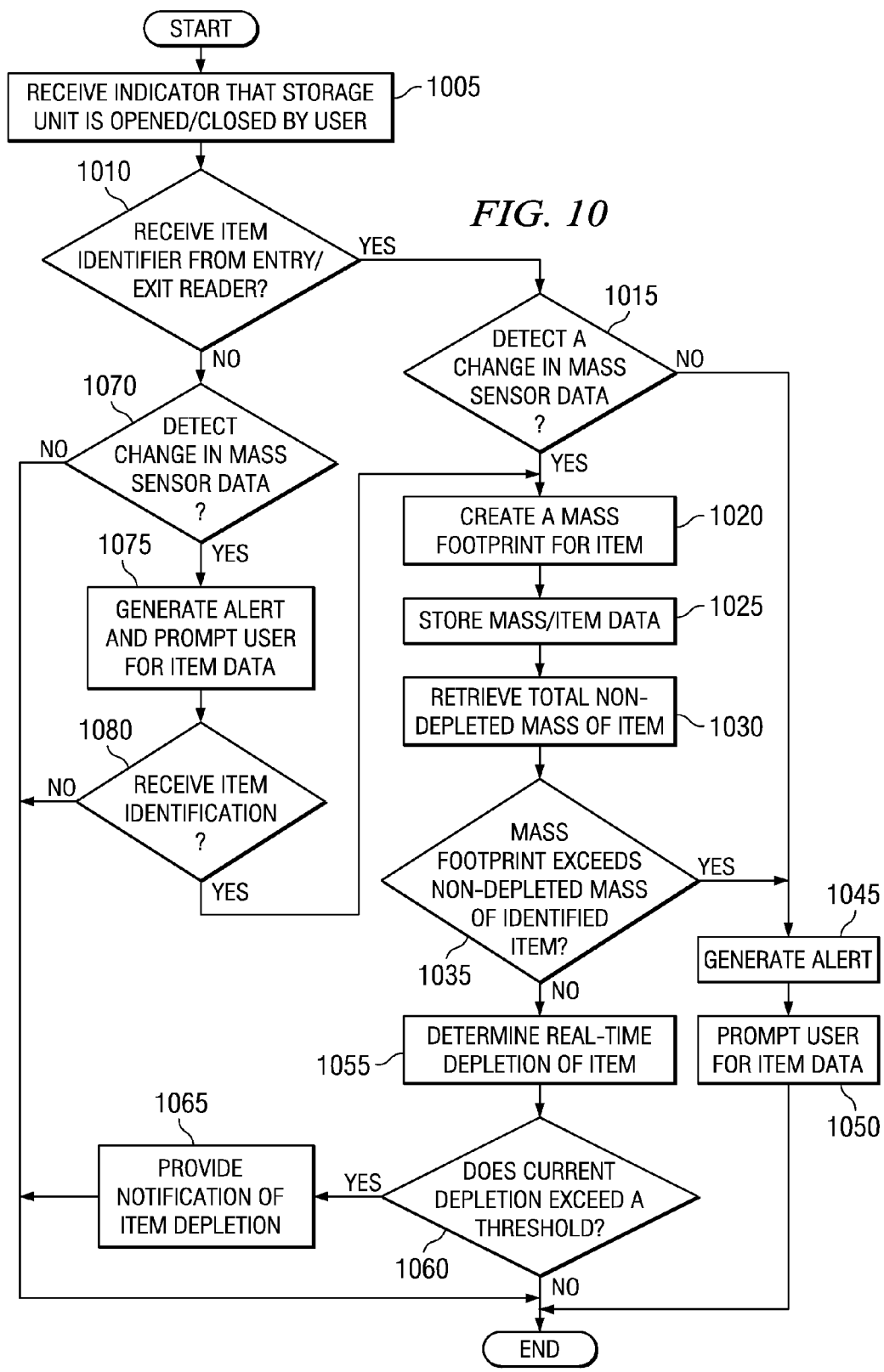
FIG. 10 is a flowchart illustrating a process for detecting a depletion of a given item within a storage unit in accordance with an illustrative embodiment.

FIG. 10 is a flowchart illustrating a process for detecting a depletion of a given item within a storage unit in accordance with an illustrative embodiment. The process is implemented by controller 220 in FIG. 2.

The controller receives an indication that a storage unit has been opened and/or closed by a user (step 1005). The controller determines whether an item identifier is received from an item identifier (step 1010) to form an identified item. If the controller receives an item identifier identifying an item being placed inside a storage unit, the controller determines if a change in mass sensor data from one or more mass sensors associated with a mass sensor shelf is detected (step 1015). If a change in mass sensor data is detected, the controller utilizes the mass sensor data to create a mass footprint for the identified item (step 1020). The controller then stores the current mass footprint data determined based on the mass sensor data and the item identification data received from an item identifier in a database (step 1025).

The controller retrieves the total non-depleted mass of the identified item (step 1030). The non-depleted mass of the item can be retrieved from the database, from an identifier tag associated with the identified item, and/or retrieved from a remote database over a network.

The controller determines if the current mass footprint exceeds a non-depleted mass of the identified item (step 1035). If the non-depleted mass is exceeded by the current mass footprint for the item, the controller generates an alert to the user (step 1045). The controller prompts the user for item data (step 1050) regarding identification and/or location for the item with the process terminating thereafter.

Returning to step 1035, if the current mass footprint does not exceed a non-depleted mass for the item, the controller determines a real-time depletion for the item (step 1055) by subtracting the current mass of the item included in the mass footprint from the original non-depleted mass of the item.

The controller then determines if the current depletion level of the item exceeds threshold depletion (step 1060). If the current depletion does not exceed the threshold, the process terminates thereafter. If the current depletion does exceed the threshold, the controller provides a notification of item depletion (step 1065) with the process terminating thereafter. The notification can be provided to the user via the user interface. In an alternative embodiment, the controller automatically orders a replacement item from a service that delivers ordered items to a consumer residence and/or business location.

Returning now to step 1015, if the controller receives a new item identifier from an item identifier but does not detect a change in mass sensor data, the controller generates an alert to a user (step 1045) prompting the user to confirm item identification data and/or item location data (step 1050) with the process terminating thereafter. As used herein, item location data refers to location information regarding a location of an item in a storage unit. Item location data includes data indicating a location anywhere in a storage unit, including a portion or quadrant of a mass sensor shelf on which an item can be found.

Returning now to step 1010, if the controller does not receive an item identifier from an item identifier when a storage unit is opened and/or closed, the controller determines if a change is detected in mass data from one or more mass sensor shelves associated with the storage unit (step 1070). If no change is detected, the process terminates thereafter. If a change in mass data is detected, the controller generates an alert and prompts a user to enter item data (step 1075) identifying the item and/or confirming a location for the item in the storage unit. If the controller receives an item identification from the user (step 1080), the controller creates a mass footprint for the item (step 1020) and performs the remainder of the steps in 1025-1065. Returning to step 1080, the controller will wait a predetermined period of time. If the controller does not receive an item identification from a user prior to expiration of the predetermined time period, the process terminates thereafter.

Determining depletion of consumable items based on historical trends fails to compensate for external forces influencing the rate of depletion of consumable items. Moreover, consumption rates of some items are so sporadic or erratic that it is impossible or impractical to track depletion rates based on past usage. The failure to accurately estimate usage of consumable items can lead to overstocking of some items that are replaced earlier than necessary, as well as under stocking of other items that are not replaced when needed. Therefore, the illustrative embodiments provide a computer implemented method, apparatus, system, and computer usable program code for monitoring a real-time depletion of an item in a storage unit. A controller identifies an item placed in the storage unit to form an identified item. The controller detects a change in a mass sensor data from a mass sensor shelf in a set of mass sensor shelves associated with the storage unit. The controller associates the mass sensor data with the identified item to form a current mass for the identified item. The controller determines a depletion of the identified item based on a difference between the current mass and a previous mass for the identified item.

Monitoring real-time depletion of items in a storage unit overcomes the problems associated with accurate and timely restocking of consumable items associated with a storage unit, such as a refrigerator or storage cabinet.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The illustrative embodiments can take the form of an entirely hardware embodiment, an entirely software embodiment or an embodiment containing both hardware and software elements. The illustrative embodiments are implemented in software, which includes but is not limited to firmware, resident software, microcode, etc.

Furthermore, the illustrative embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiments have been presented for purposes of illustration and description, and is not intended to be exhaustive or limited to the illustrative embodiments in the form disclosed. Many modifications and variations will be apparent to those of ordinary skill in the art. The embodiment was chosen and described in order to best explain the principles of the illustrative embodiments, the practical application, and to enable others of ordinary skill in the art to understand the illustrative embodiments for various embodiments with various modifications as are suited to the particular use contemplated.

What is claimed is:

1. A computer implemented method for monitoring a real-time depletion of an item in a storage unit, the computer implemented method comprising:
    identifying an item placed on a mass sensor shelf in the storage unit to form an identified item, wherein the identified item is placed anywhere on the mass sensor shelf;
    generating a mass footprint of the identified item, wherein the mass footprint comprises information regarding an estimated location of the identified item and an impression of a portion of the identified item in contact with the mass sensor shelf;

detecting a change in a mass sensor data from the mass sensor shelf, wherein the mass sensor shelf has a mass sensor grid, and wherein each mass sensor in the mass sensor grid detects a mass of the identified item based upon the mass footprint of the identified item;

associating the change in the mass sensor data with the identified item to form a current mass for the identified item;

and determining a depletion of the identified item based on a difference between the current mass and a previous mass for the identified item.

2. The computer implemented method of claim 1 wherein the previous mass is a non-depleted mass for the identified item.

3. The computer implemented method of claim 1 wherein the storage unit is selected from a group consisting of a refrigeration unit, a freezer, an ice box, a pantry, a cupboard, a set of shelves, and a cabinet.

4. The computer implemented method of claim 1 wherein the mass sensor data is data received from a set of mass sensors associated with a mass sensor shelf.

5. The computer implemented method of claim 2 wherein the non-depleted mass of the identified item is retrieved from a database.

6. The computer implemented method of claim 1 further comprising:

determining whether a current mass of the identified item is greater than a non-depleted mass for the identified item; and responsive to determining that a current mass of the identified item is greater than a non-depleted mass for the identified item, generating an alert for a user, wherein generating an alert comprises prompting the user to identify the item via a user interface.

7. The computer implemented method of claim 1 further comprising:

responsive to the depletion of the identified item exceeding a threshold depletion, sending a notification to a user.

8. The computer implemented method of claim 7 wherein generating a notification to the user further comprises:

adding the identified item to a list of items to be ordered from a food service provider for delivery.

9. The computer implemented method of claim 1 further comprising:

detecting the removal of an item from the storage unit based on the mass footprint for the identified item.

10. An apparatus comprising:

a mass sensor shelf in a storage unit having a mass sensor grid, wherein the mass sensor grid detects a mass of an item placed on the mass sensor shelf and generates a plurality of mass sensor data; and a controller operably coupled with the mass sensor shelf and with a storage device storing a plurality of instructions configured to cause a processor of the controller to identify an item placed anywhere on the mass sensor shelf to form an identified item; generate a mass footprint of the identified item based on an estimated location of the identified item on the mass sensor shelf and an impression of a portion of the identified item in contact with the mass sensor shelf; detect a change in the plurality of mass sensor data from the mass sensor shelf; associate the change in mass sensor data with the identified item based upon the mass footprint of the identified item to form a current mass for the identified item; and determine a depletion of the identified item based on a difference between the current mass and a previous mass for the identified item.

11. The apparatus of claim 10 wherein the previous mass is a non-depleted mass for the identified item.

12. The apparatus of claim 10 wherein the storage unit is selected from a group consisting of a refrigeration unit, a freezer, an ice box, a pantry, a cupboard, a set of shelves, and a cabinet.

13. The apparatus of claim 10 wherein the mass sensor data is data received from a set of mass sensors associated with a mass sensor shelf.

14. The apparatus of claim 10 wherein the processor unit further executes to the computer usable program code to determine whether a current mass of the identified item is greater than a non-depleted mass for the identified item and generate an alert to a user in response to determining that a current mass of the identified item is greater than a non-depleted mass for the identified item, wherein in executing the computer usable program code to generate an alert the processor unit executes the computer usable program product to prompt the user to identify the item via a user interface.

15. A computer program product comprising:

a computer-recordable storage medium storing computer usable program code for identifying a depletion of an item in a storage unit, the computer program product comprising:

computer usable program code for identifying an item on a mass sensor shelf in the storage unit to form an identified item, wherein the identified item is placed anywhere on the mass sensor shelf;

computer usable program code for generating a mass footprint of the identified item, wherein the mass footprint comprises information regarding an estimated location of the identified item and an impression of a portion of the identified item in contact with the mass sensor shelf;

computer usable program code for detecting a change in mass sensor data from the mass sensor shelf wherein the mass sensor shelf has a mass sensor grid, and wherein each mass sensor in the mass sensor grid detects a mass of the identified item based upon the mass footprint of the identified item;

computer usable program code for associating the change in mass sensor data with the identified item to form a current mass for the identified item;

and computer usable program code for determining a depletion of the identified item based a difference between the current mass and a previous mass for the identified item.

16. A system for identifying a depletion of an item, the system comprising:

a set of mass sensor shelves, wherein a given mass sensor shelf in the set of mass sensor shelves detects a change in mass sensor data;

a set of item identifiers, wherein an item identifier in the set of item identifiers obtains an identification code from an identification tag associated with the item placed anywhere on the given mass sensor shelf to form an identified item; and a control unit, wherein the control unit generates a mass footprint of the identified item based upon data received from the set of mass sensor shelves and the set of item identifiers, wherein the mass footprint comprises information regarding an estimated location of the identified item and an impression of a portion of the identified item in contact with the mass sensor shelf; wherein the control unit associates the change in mass sensor data with the identified item based upon the mass footprint of the identified item to form a current mass for the identified item; and wherein the control unit determines a depletion for the identified item based on a difference between the current mass and a predefined non-depleted mass for the identified item.

17. The computer implemented method of claim 1, wherein determining the depletion is based on a net mass of the identified item remaining after subtracting a tare mass of an empty container, wherein the tare mass is a mass of the empty container.

* * * * *